(12) United States Patent
Jothilingam

(10) Patent No.: US 12,067,146 B2
(45) Date of Patent: Aug. 20, 2024

(54) METHOD AND SYSTEM OF SECURING SENSITIVE INFORMATION

(71) Applicant: Microsoft Technology Licensing, LLC, Redmond, WA (US)

(72) Inventor: Raghu Jothilingam, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 17/841,396

(22) Filed: Jun. 15, 2022

(65) Prior Publication Data

US 2023/0409736 A1 Dec. 21, 2023

(51) Int. Cl.
*G06F 21/62* (2013.01)
*G06F 21/31* (2013.01)
*G06F 21/33* (2013.01)

(52) U.S. Cl.
CPC .......... *G06F 21/6245* (2013.01); *G06F 21/31* (2013.01); *G06F 21/33* (2013.01); *G06F 21/6209* (2013.01)

(58) Field of Classification Search
CPC ...... G06F 21/31; G06F 21/33; G06F 21/6209; G06F 21/6245; G06F 21/44; G06F 21/64; G06F 21/84; G06F 16/906; G06Q 10/06; G16H 50/20; H04L 51/234; H04L 63/0227; H04L 63/1408; H04L 63/20
See application file for complete search history.

(56) References Cited

U.S. PATENT DOCUMENTS

| | | | |
|---|---|---|---|
| 8,011,003 B2 | 8/2011 | Rowney et al. | |
| 8,407,805 B2 | 3/2013 | Warrington et al. | |
| 8,752,204 B2 | 6/2014 | Davis et al. | |
| 9,195,853 B2 | 11/2015 | Fox | |
| 9,672,487 B1 * | 6/2017 | Garcia | G06Q 10/06 |
| 9,928,379 B1 * | 3/2018 | Hoffer | G16H 50/20 |
| 10,853,570 B2 | 12/2020 | Matichuk et al. | |
| 11,144,669 B1 | 10/2021 | Rao | |
| 2009/0019379 A1 | 1/2009 | Pendergast et al. | |
| 2009/0025063 A1 | 1/2009 | Thomas | |

(Continued)

OTHER PUBLICATIONS

"How to redact an email in Outlook", Retrieved from: https://web.archive.org/web/20210507215248/https://www.hexamail.com/guides/redactoutlook.htm, May 7, 2021, 11 Pages.

(Continued)

*Primary Examiner* — Le H Luu
(74) *Attorney, Agent, or Firm* — Novo TechIP International PLLC

(57) ABSTRACT

A system and method for securing a portion of a communication includes receiving a request to mark a portion of a communication as sensitive, where the communication includes a sensitive portion and an unsensitive portion. Upon receiving the request, a data property of the sensitive portion is set to a sensitive content property. After setting the data property, the method includes, securing the sensitive portion by initiating security calls for handling the sensitive portion, and transmitting the communication to a recipient. After the communication is transmitted to the recipient, access to the unsensitive portion is provided to the recipient, while the sensitive portion is redacted until the recipient is authenticated for receiving access to the sensitive portion.

20 Claims, 10 Drawing Sheets

(56) References Cited

U.S. PATENT DOCUMENTS

| | | | |
|---|---|---|---|
| 2017/0093776 A1 | 3/2017 | Dixon | |
| 2019/0020687 A1 | 1/2019 | Noon et al. | |
| 2020/0012817 A1 | 1/2020 | Damick | |
| 2021/0058377 A1 | 2/2021 | Khan | |
| 2021/0400008 A1 | 12/2021 | Khan | |
| 2022/0245283 A1* | 8/2022 | Springer | G06F 21/84 |
| 2022/0329558 A1* | 10/2022 | Khan | H04L 51/234 |
| 2023/0058063 A1* | 2/2023 | Redlich | H04L 63/0227 |
| 2023/0105207 A1* | 4/2023 | Srivastava | G06F 16/906 |
| | | | 726/26 |
| 2023/0143933 A1* | 5/2023 | Wang | G06F 21/64 |
| | | | 726/1 |
| 2023/0214481 A1* | 7/2023 | Singh | G06F 21/44 |
| | | | 726/26 |
| 2023/0308458 A1* | 9/2023 | Varsanyi | H04L 63/1408 |
| 2023/0403293 A1* | 12/2023 | Zhang | H04L 63/20 |

OTHER PUBLICATIONS

"Removing sensitive content from PDFs in Adobe Acrobat DC", Retrieved from: https://helpx.adobe.com/acrobat/using/removing-sensitive-content-pdfs.html, Jul. 22, 2021, 17 Pages.

"International Search Report and Written Opinion Issued in PCT Application No. PCT/US23/019537", Mailed Date: Jul. 28, 2023, 13 Pages.

* cited by examiner

METHOD AND SYSTEM OF SECURING SENSITIVE INFORMATION

BACKGROUND

Many types of digital content generated by users include sensitive information. The sensitive information may include private, personal and/or confidential data, or any other data that requires protection. In some cases, an entire document contains sensitive information. However, it is also common for a small portion of the document to include sensitive information. For example, an email which includes multiple lines of text may also include a password required for accessing a website. Because the email contains other data, it may not be necessary or desirable to mark the entire email as confidential. However, the sender of the email may desire to protect the password from unauthorized access. While there are mechanisms for protecting entire documents, it is often difficult or not possible to protect a portion of a large document or communication.

Hence, there is a need for improved systems and methods of securing sensitive information.

SUMMARY

In one general aspect, the instant disclosure presents a data processing system having a processor and a memory in communication with the processor wherein the memory stores executable instructions that, when executed by the processor, cause the data processing system to perform multiple functions. The functions may include receiving a request to mark a portion of a communication as sensitive, where the communication includes a sensitive portion and an unsensitive portion. Upon receiving the request, a data property of the sensitive portion is set to a sensitive content property. After setting the data property, the functions include, securing the sensitive portion by initiating security calls for handling the sensitive portion, and transmitting the communication to a recipient. After the communication is transmitted to the recipient, access to the unsensitive portion is provided to the recipient, while the sensitive portion is redacted until the recipient is authenticated for receiving access to the sensitive portion.

In yet another general aspect, the instant disclosure presents a method for securing a portion of a communication. In some implementations, the method includes receiving a request to mark a portion of a communication as sensitive, where the communication includes a sensitive portion and an unsensitive portion. Upon receiving the request, a data property of the sensitive portion is set to a sensitive content property. After setting the data property, the method includes, securing the sensitive portion by initiating security calls for handling the sensitive portion, and transmitting the communication to a recipient. After the communication is transmitted to the recipient, access to the unsensitive portion is provided to the recipient, while the sensitive portion is redacted until the recipient is authenticated for receiving access to the sensitive portion.

In a further general aspect, the instant application describes a non-transitory computer readable medium on which are stored instructions that when executed cause a programmable device to perform functions of receiving a request to mark a portion of a communication as sensitive, where the communication includes a sensitive portion and an unsensitive portion. Upon receiving the request, a data property of the sensitive portion is set to a sensitive content property. After setting the data property, the functions include, securing the sensitive portion by initiating security calls for handling the sensitive portion, and transmitting the communication to a recipient. After the communication is transmitted to the recipient, access to the unsensitive portion is provided to the recipient, while the sensitive portion is redacted until the recipient is authenticated for receiving access to the sensitive portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
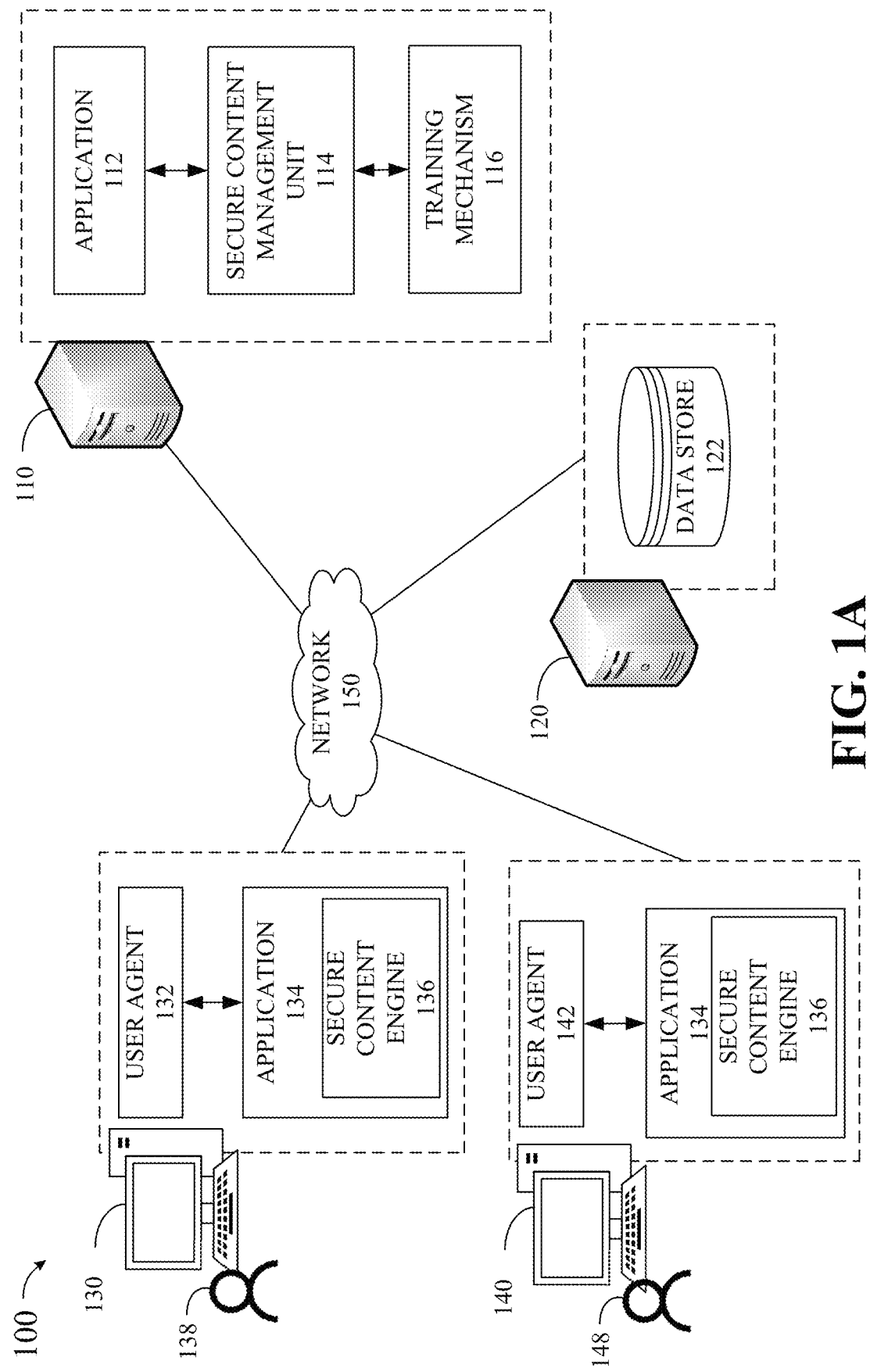
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

It is common for users of computing devices to generate sensitive content that cannot be freely shared with others. This may occur in many types of documents. For example, emails, instant messages, text messages, word documents, presentations, audio or video files, spreadsheets and more may include portions that are sensitive. While some applications provide certain mechanisms for protecting sensitive content, many other types of applications do not offer such capabilities. Furthermore, applications that offer content security each have their own different mechanism for securing content. This leads to confusion and non-uniformity across different applications.

Furthermore, applications that offer content protection, often protect an entire document. For example, most communication applications (e.g., email applications) enable the sender to secure an entire email. While this is helpful when an entire document contains sensitive information, it can lead to inconvenience, when only a small portion of the content is sensitive. For example, a multiple page word document that contains only one line of sensitive information may require authentication every time the document is opened. As a result, the unsensitive parts of the documents are not accessible to users who do not have the necessary authentication. This may lead to customer frustration. Furthermore, it is often beneficial to provide access to unsensitive portions of documents to offer users context for the sensitive portion. For example, blocking only portions of communications could give recipients context prior to the recipients being authenticated to receive sensitive information within the communications. Thus, there exists a technical problem of lack of mechanisms for efficiently and effectively redacting a sensitive portion of communications before the recipient is authenticated to receive the sensitive portion.

To address these technical problems and more, in an example, this description provides technical solutions for securing a portion of many different types of content. This may involve securing and redacting portions of content in communications until a recipient has been authenticated by a system. This may be achieved by enabling a user to select a portion of content as sensitive (e.g., a portion of a communication), and setting a data property associated with the content as sensitive. A defining unit may then be used to initiate the security protocols for the sensitive data as required by the application. This may involve masking the sensitive data and transmitting it to other units that handle secure storage and retrieval. Secure storage may involve securing the sensitive data in specific secure locations. When a recipient attempts to access such information, a secure data extraction unit may make use of the security layer to authorize and authenticate the user and when authenticated, extract the data which has been stored securely for presentation to the authenticated user. In some implementations, a machine-learning (ML) model is used to identify sensitive content and provide a suggestion to the user (e.g., author) to secure the content. The ML model may be trained based on user feedback data to provide custom recommendations based on each user's use of the applications. Thus, portions within documents and communications (such as emails, text messages, video streams, etc.) can be tagged as sensitive either manually or automatically by the creation module or the sending client. The receiving client/module may redact those portions until the recipient users are properly authenticated and/or have the right level of security to access the secured content. In this manner, the technical solutions provide a unified mechanism for securing portions of content across multiple applications. Both the process of securing the content and retrieving the content is efficient and easy to perform and requires minimal processing.

As will be understood by persons of skill in the art upon reading this disclosure, benefits and advantages provided by such implementations can include, but are not limited to, a technical solution to the technical problems of lack of coherent mechanisms for efficiently securing portions of content in different applications. The technical solutions enable automatic generation of recommendations when potential sensitive information is encountered. Furthermore, the technical solutions offer a mechanism for securing a desired portion of larger communication via use of a data property and providing access to the unsecured portion of the communication to the recipient, while access to the secured portion is withheld until the recipient is authenticated. In this manner, the technical solution increases content security, improves uniformity of security operations across various applications and contents, and improves efficiency and customer satisfaction. The technical effects at least include (1) improving the efficiency and accuracy of securing sensitive content; (2) improving the efficiency and accuracy of identifying sensitive content that may require protection; and (3) improving the efficiency of securing portions of communications, while providing access to the unsecured portions of the communication to the communication's recipient.

As used herein, the terms "content," may refer to any type of data that can be generated by a user and shared with other users. This includes, text, documents, multi-media content and the like. The term "document" may refer to any digital document. Furthermore, the term "application" or "surface" may refer to any software program that enables a user to interact with content. Moreover, the term "communication" may refer to any message (e.g., email message, instant message, text message, etc.) created by a sender for transmission to one or more recipients.

FIG. 1A illustrates an example system 100, upon which aspects of this disclosure may be implemented. The system 100 may include a server 110, which may itself include an application 112, a secure content management unit 114 and a training mechanism 116. While shown as one server, the server 110 may represent a plurality of servers that work together to deliver the functions and services provided by each unit or application included in the server 110. The server 110 may operate as a cloud-based server for secure content management services for one or more applications such as application 112 and/or application 134. The server 110 may also operate as a shared resource server located at an enterprise accessible by various computer client devices such as a client devices 130 and 140.

Each of the client devices 130 and 140 may be a type of personal, business or handheld computing device having or being connected to input/output elements that enable a user to interact with various applications (e.g., application 112 or application 134). Examples of suitable client devices 130 and 140 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 5 and 6.

The client device 130 may represent a client device used by a user 138 to mark a portion of content as sensitive. The user 138 may utilize a local application 134 of the client device 130 to mark the content as sensitive. The application 134 may be a software program executed on the client devices 130 and 140 that configures the device to be responsive to user input to allow the user 138/148 to perform various functions within the application 134. The functions may include creating, editing and/or viewing content. The application 134 may also enable users to mark portions of content as sensitive and/or view content marked as sensitive. Examples of suitable applications include, but are not limited to, a word processing application, a spreadsheet application, a presentation application, a communications application (e.g., email application, instant messaging application, videoconferencing application), and the like. Different types of applications may utilize different mechanisms (e.g., different data properties) for marking the content sensitive and/or retrieving secured content. The application 134 may provide a surface via which the user 138 can secure content. The client device 140 may represent a client device used by a user 148 to retrieve secured content. The user 148 may retrieve the secured content via the application 134 of the client device 140.

The application 134 may provide the functionalities for marking content sensitive, securing content and/or retrieving secured content via a secure content engine 136. The secure content engine 136 may include multiple elements that perform various functions for securing and retrieving content. These elements are described in more detail with respect to FIG. 1B.

In some examples, the application a user interacts with is executed on the server 110 (e.g., application 112) and provided via an online service. In some implementations, web applications communicate via the network 150 with a user agent 132/142, such as a browser, executing on the client devices 130 and 140. The user agent 132/142 may provide a user interface that allows the user to interact with the application 112, mark content as sensitive and/or retrieve secured content. The client devices 130/140 may be connected to the server 110 via the network 150. The network 150 may be a wired or wireless network(s) or a combination of wired and wireless networks that connect one or more elements of the system 100.

The server 110 may include and/or execute a secure content management unit 114, which may provide functionalities such as providing authentication and secure storage of content marked sensitive via application 112 or 134. The secure content may be stored in a storage medium such as the data store 122. The secure content management unit may also include a ML model for analyzing data generated on a surface (e.g., via applications 112/134) to determine if a portion of the content includes sensitive information that may require protection. These ML models are discussed in greater detail with respect to FIG. 1B.

One or more ML models implemented by the secure content management unit 114 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage.

As a general matter, the methods and systems described herein may include, or otherwise make use of one or more ML model to identify sensitive information in content. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user action to identify sensitive content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models or analyzing content, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 120 which may be connected to or include the data store 122 which may function as a repository in which databases relating to training models, and documents containing secured content may be stored. Although shown as a single data store, the data store 122 may be representative of multiple storage devices and data stores which may be accessible by one or more of the secure content management unit 114, training mechanism 116, and applications 112/134.

Figure 1B:
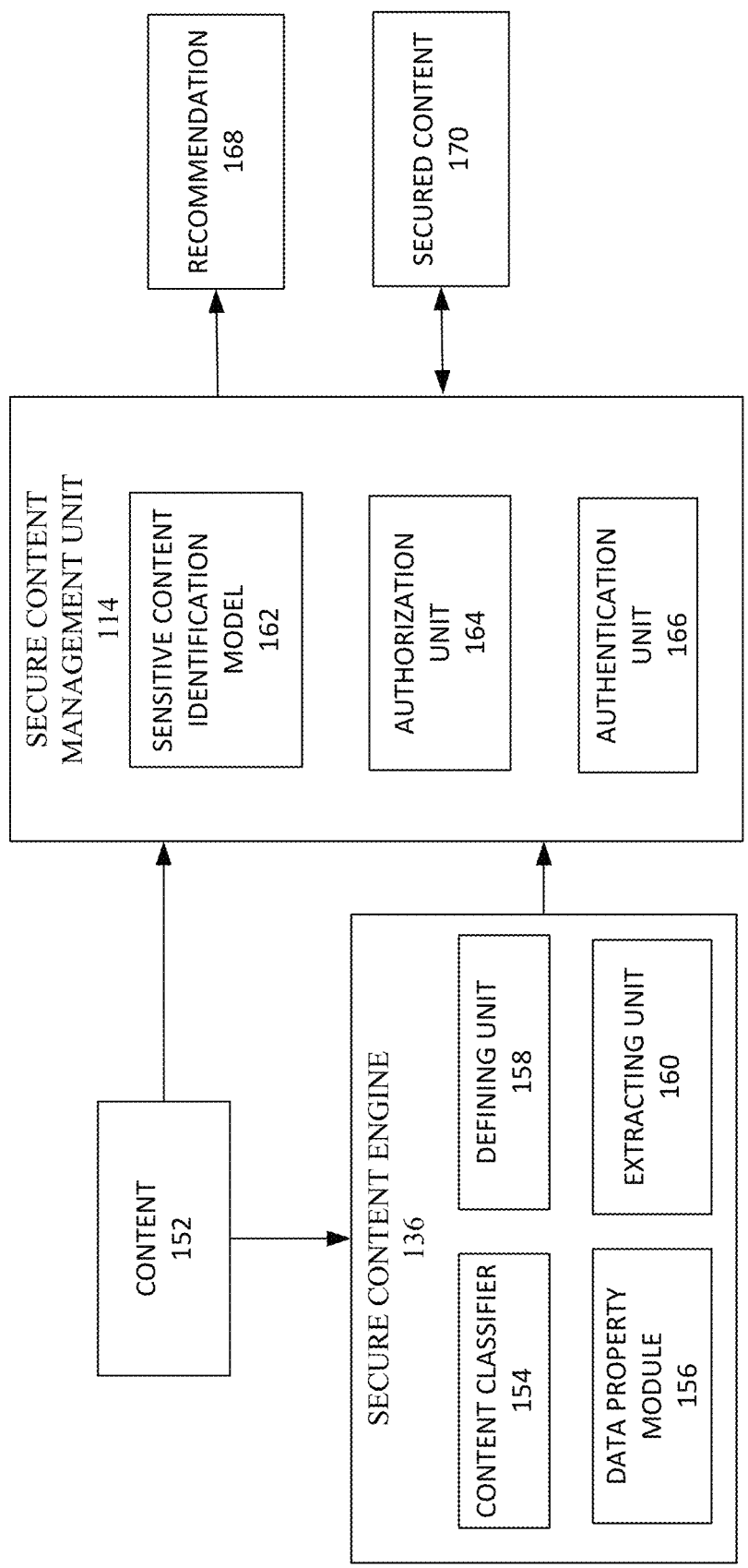
FIG. 1B depicts an example data flow between some elements of an example system upon which aspects of this disclosure may be implemented.

FIG. 1B depicts an example data flow between some of the elements of the example system 100. The secure content engine 136 may include a content classifier 154, data property configuration 156, defining unit 158 and extracting unit 160. As content 152 is created and/or the need for sharing the content 152 arises, the user 138 who is interacting with the content 152 may select a portion the content 152 to mark the selected portion as sensitive information. This may be achieved, by the user 138 selecting a portion of the content and utilizing a user interface (UI) option to indicate that the selected content contains sensitive information. For example, the application via which the content is being created/viewed (e.g., email application) may provide a menu option for marking the selected portion as sensitive (e.g., private or confidential).

The selected portion of content 152 may be transmitted to the secure content engine 136 for processing. The secure content engine 136 may utilize the content classifier 154 to identify the type of content selected. In some implementations, this simply involves examining the surface from which the content was received (e.g., type of document or communication). In other implementation, the process also includes examining the content to identify the type of data in the content. For example, the content classifier 154 may determine if the selected content is an email message, instant message, text in a word document, a cell in a spreadsheet, audio and/or video content and the like. This may be done because different types of content may need to be handled differently. By utilizing the content classifier 154, the secure content engine 136 can identify the type of content and ensure appropriate security protocols are followed for the identified content and/or application.

To identify the selected portion as data that requires security, the secure content engine 136 may make use of a data property module 156. The data property module 156 may operate to define and/or provide a data property associated with sensitive data. The manner in which the data property is defined may vary in different applications and may depend on the settings and requirements of each application. For example, in Microsoft OneNote®, the data property is referred as secure info. In Microsoft Teams®, the data property type referred to as sensitive may be defined. The data property may classify the data as sensitive, be exposed to the users such that users can mark the data as sensitive and may be available in all applications that offer content security. The data property may be a configuration data property that can be stored with the data and determines how the data is treated by the application and other applications. The data property may have a number of associated parameters. In an example, these parameters are set by the user. The parameters may include a password required to access the sensitive data, a time restriction associated with the availability of the sensitive data, and/or identification information for the user/users that are authorized to access the sensitive data. The identification information may include user account information of the authorized recipient (e.g., email address or username of the recipient). The time restriction may include an amount of time the sensitive data is available to the recipient upon authentication. For example, the user 138 may choose to make the sensitive data available to the recipient user 148 indefinitely, as long as authentication is provided. Alternatively, the user 138 may choose a limited time for making the sensitive data available to the recipient (e.g., only accessible once, only accessible for 24 hours, and the like).

Once the data property has been set for the selected content, via the data property module 156, a defining unit 158 may be utilized to define the data as sensitive. This may involve masking the data to ensure privacy, before pushing the data to the backend for further processing. While providing the data to the backend, the defining unit 158 may transmit a message that the data is sensitive data and as such requires especial handling. This may involve ensuring that the data is handled via a security layer and/or the application interacts with the backend in a secure manner. This may be achieved by transmitting the sensitive data in a secure manner to the secure content management unit 114 which will in turn secure the data (e.g., encrypt the data) and provides the secured data as secured content 170 for storage. Storage of the secured content 170 may involve storing the data in a specific location (e.g., at a specific data partition). For example, the data may be stored in a specific shard and the portion of the content that is sensitive may be stored with a sensitive tag.

Once the data is marked as secured and shared with a recipient user, the unsecured portion of the content may be displayed to the user, while the secured portion is redacted. The recipient may then submit a request for reviewing the secured portion. Upon receiving the request, an extracting unit 160 of the secure content engine 136 in the recipient's application may be utilized to retrieve the data. The extracting unit 160 may make use of the security layer to authorize the application, authenticate the recipient and extract the data. This may involve making use of the authorization unit 164 and authentication unit 166 of the secure content management 114. The authorization unit 164 authorizes interactions between the surface that provides access to the content and the service layer that provides the security protocols. This may involve ensuring that the application is authorized to access this type of data and offers the protocols for safe retrieval of the sensitive data (e.g., options to redact the data before authentication is provided or redact the data after the time window for access has passed).

The authentication unit 166 may authenticate the recipient user to ensure the user can access the sensitive content. This may involve determining the type of authentication required for accessing the data (e.g., data is secured with a custom password or use of a specific user account) and operating with the extracting unit 160 to present the appropriate UI elements to the user for authentication. For example, when a custom password is required to access the data, a UI element may be displayed to the user to enable the user to enter the password. The received password may then be transmitted to the authentication unit 166 to ensure the entered password matches the required password. When a user account is required for authentication, the authentication unit 166 may operate with a framework responsible for managing the user account to ensure the user is authenticated. This may involve requesting that the user enter their account information (e.g., email address and password, or Microsoft account password) to authenticate the user. Once the user is authenticated, the sensitive data may be retrieved from the secured storage location and provided to the secure content engine 136 which may make the content available to the application. It should be noted that while the authorization unit 164 and authentication unit 166 are displayed as part of the secure content management unit 114, these elements may be provided as part of the security layer of the system 100.

In some implementations, in addition to enabling the user to select a content portion as sensitive, the technical solutions disclosed herein identify content portions that may contain sensitive information and provide a recommendation to the user to secure them. This is advantageous since some users may not be aware of the availability of the functionality for protecting sensitive content, and others may fail to remember to mark a portion sensitive. By providing a recommendation for securing content that may contain sensitive information, the user is offered an opportunity to secure sensitive portions of their communications whenever such content is generated and/or shared. This may be achieved by utilizing a sensitive content identification model 162.

The sensitive content identification model 162 may be a trained natural language processing model that is trained to identify keywords, sentence structures, patterns in user's behaviors and others that indicate the presence of sensitive information. This may be achieved by receiving as an input the content 152, analyzing the content 152 to identify portions that may be indicative of sensitive information (e.g., passwords, credit card numbers, social security numbers, pins, etc.), and generating as output a recommendation 168 to secure any identified portion. The content 152 may be received as the user is interacting with content (e.g., creating content) and/or when the user takes actions to share the content (e.g., upon clicking on the send button of an email or instant message). The recommendation may include an identification of the identified sensitive portion and may present the user with a suggestion to secure the identified portion. The recommendation 168 may be transmitted to the application 112/134 for display to the user. For example, after the user clicks on a send button to send an email, a notification may be displayed that states "It appears your email contains sensitive information. Would you like to secure the sensitive information prior to sending it?" When the user selects to secure the content, they may be taken to the identified sensitive portion (e.g., the identified sensitive portion may be highlighted) and the user may be presented with options on how to secure the content (e.g., how to access the secured content and who should have access to it). It should be noted that while the sensitive content identification model 162 is displayed as being part of the secure content management unit 114, a local sensitive content identification model 162 may be available within the client devices 130/140 and may operate with the application 134 to provide recommendations.

Figure 1C:
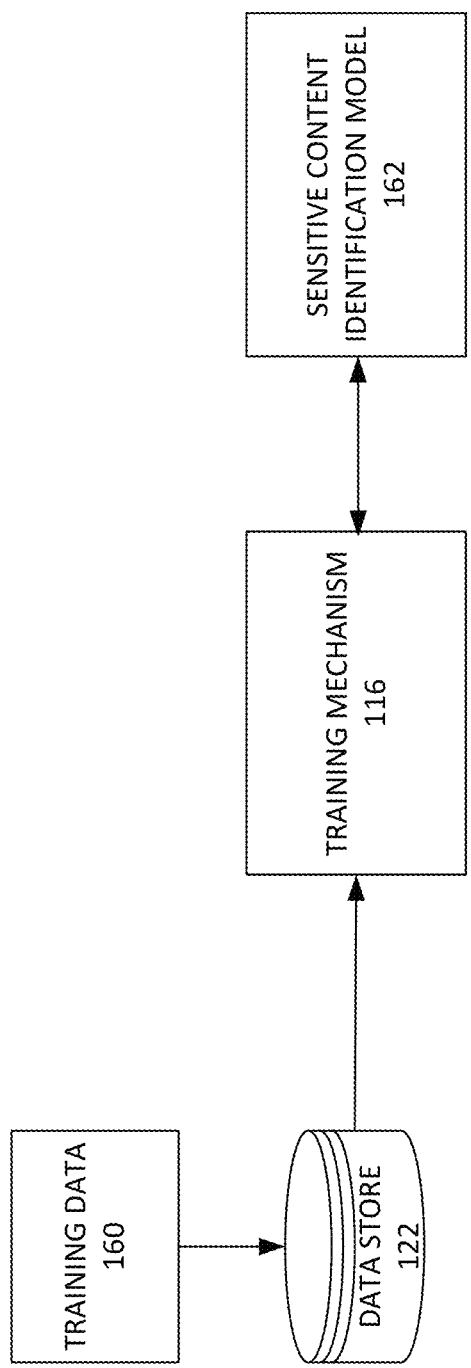
FIG. 1C how one or more ML models used by a secure content management system may be trained.

FIG. 1C depicts how one or more ML models used by the secure content management 114 may be trained by using the training mechanism 116. The training mechanism 116 may use supervised and/or unsupervised training techniques. The supervised training may make use of labeled training data sets stored in the data store 122 to provide initial and ongoing training to the sensitive content identification model 162. The initial labeled training data may include a set of keywords and patterns in content that may indicate the presence of sensitive information. For example, keywords such as password, social security number, credit card number, date of birth, and the like when combined with a number formatted in a known format may indicate the presence of confidential information. Such data may be provided as labeled datasets for training the sensitive content identification model 162.

In some implementations, to provide ongoing training, the training mechanism 116 may use feedback received as out of the ML models and/or user data from users' use of the applications. For example, after the model is trained and used, data related to whether or not a recommendation to secure sensitive content was accepted or rejected may be used to fine-tune the model for that user. Moreover, data about the types of content generally marked by a user or groups of users as sensitive may be used to provide ongoing training for the sensitive content identification model 162. Furthermore, data may be provided from the training mechanism 116 to the data store 122 to update one or more of the training datasets in order to provide updated and ongoing training. Additionally, the training mechanism 116 may receive training data such as knowledge from other pre-trained mechanisms.

Figure 2:
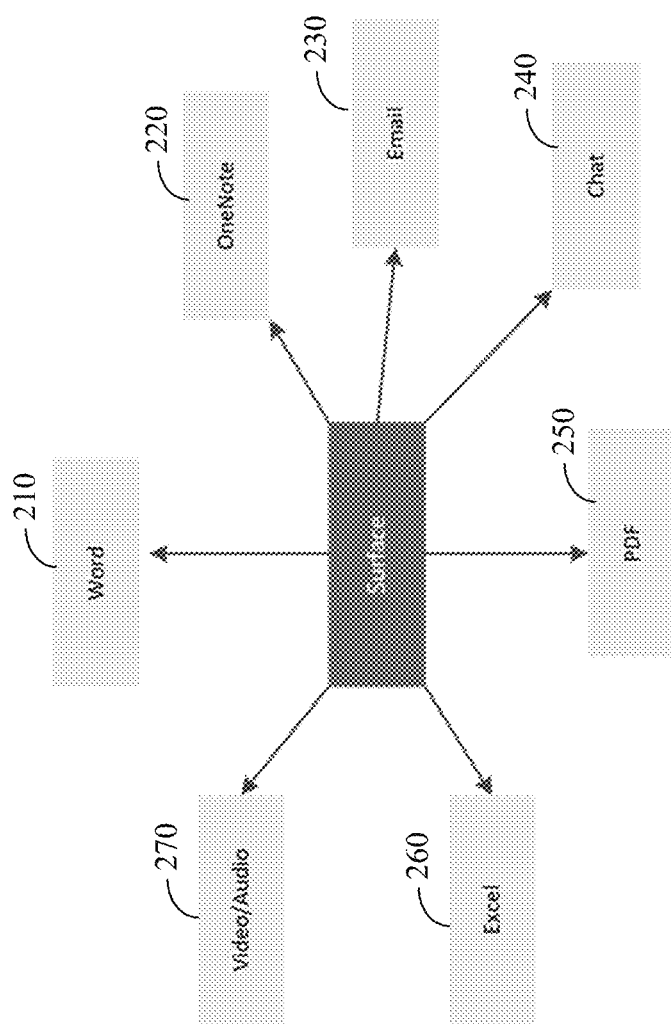
FIG. 2 an example of different types of surfaces on which aspects of this disclosure for securing content may be implemented.

FIG. 2 depicts an example of different types of surfaces on which aspects of this disclosure for securing content may be implemented. As depicted surfaces on which contents may be secured include word documents 210, note documents such as OneNote documents 220, email messages 230, chat 240 such as instant messages, PDF documents 250, spreadsheet documents such as excel documents 260, and video/audio documents 270. Each of these different surfaces may have their own UI elements for marking sensitive content and their own data properties for sensitive content. For example, marking video/audio content may involve selecting the audio/video frames that contain sensitive content. This may involve enabling the user to select a beginning and an end for the sensitive portion. For example, the user may be able to select the time in the video file at which the sensitive portion begins, as well as the time in the video at which the sensitive content ends (e.g., from the 12 second to the 34 second mark). Spreadsheet content may be marked sensitive by cell and/or by selecting a portion of content within a cell. In some implementations, the functionalities of securing content on one or more of these surfaces may be offered as a service by, for example, the secure content management 114 of FIG. 1A. In such implementations, at least some of the functionalities of the secure content engine 136 may be offered by the secure content management 114.

Figure 3A:
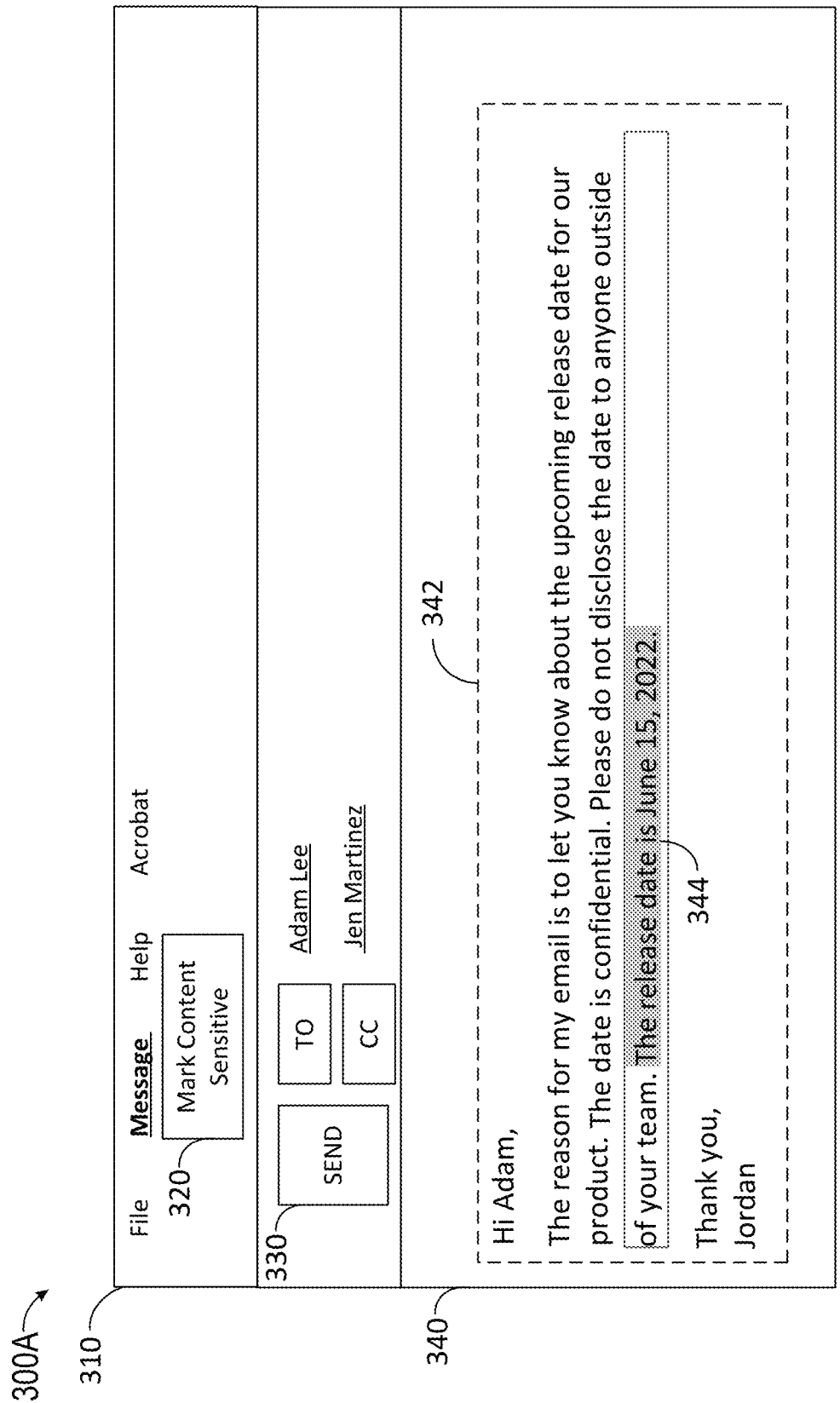
FIGS. 3A-3C depict example user interface screens of an application that offers content protection services disclosed herein.
Figure 3B:
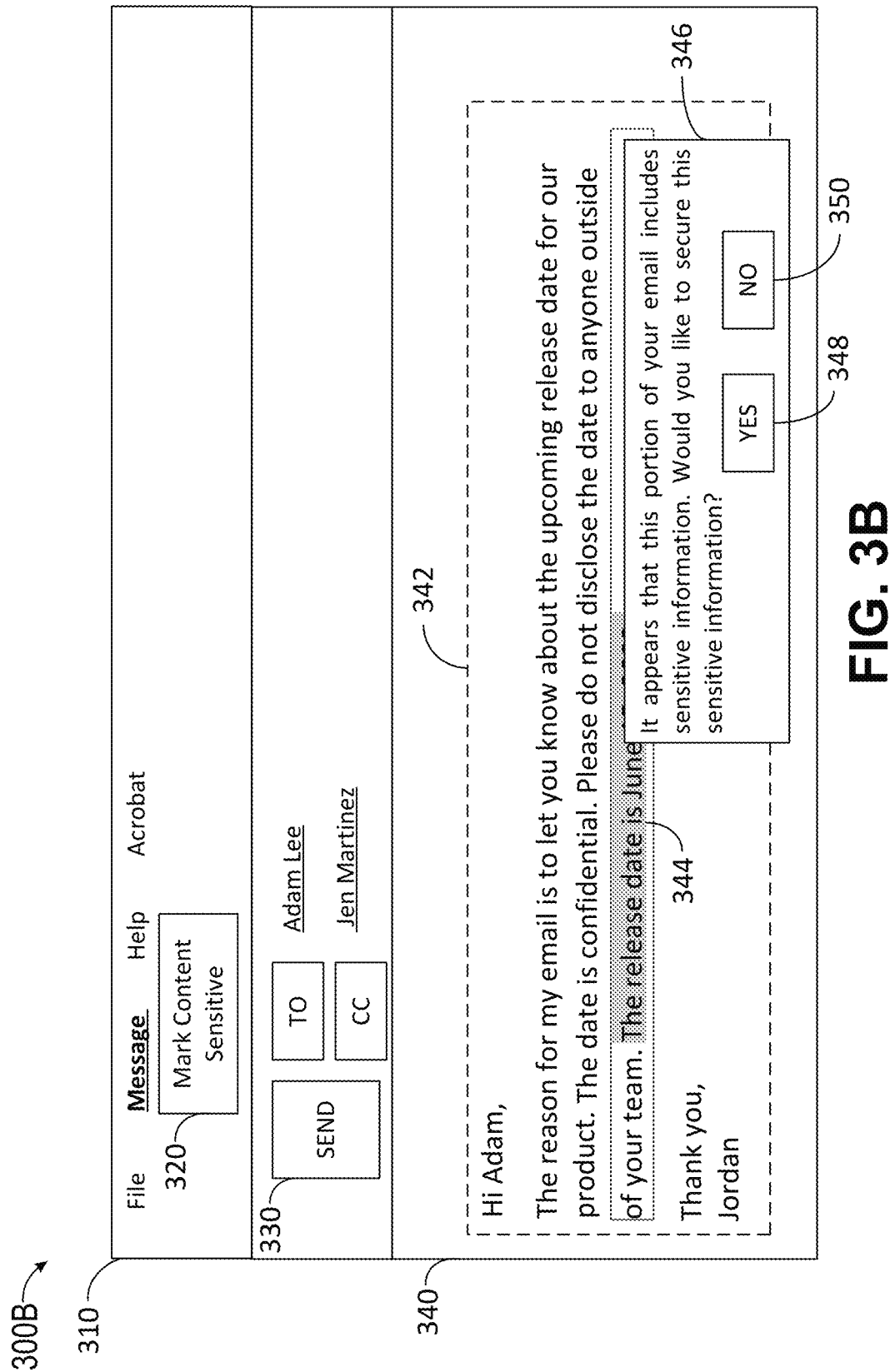
Figure 3C:
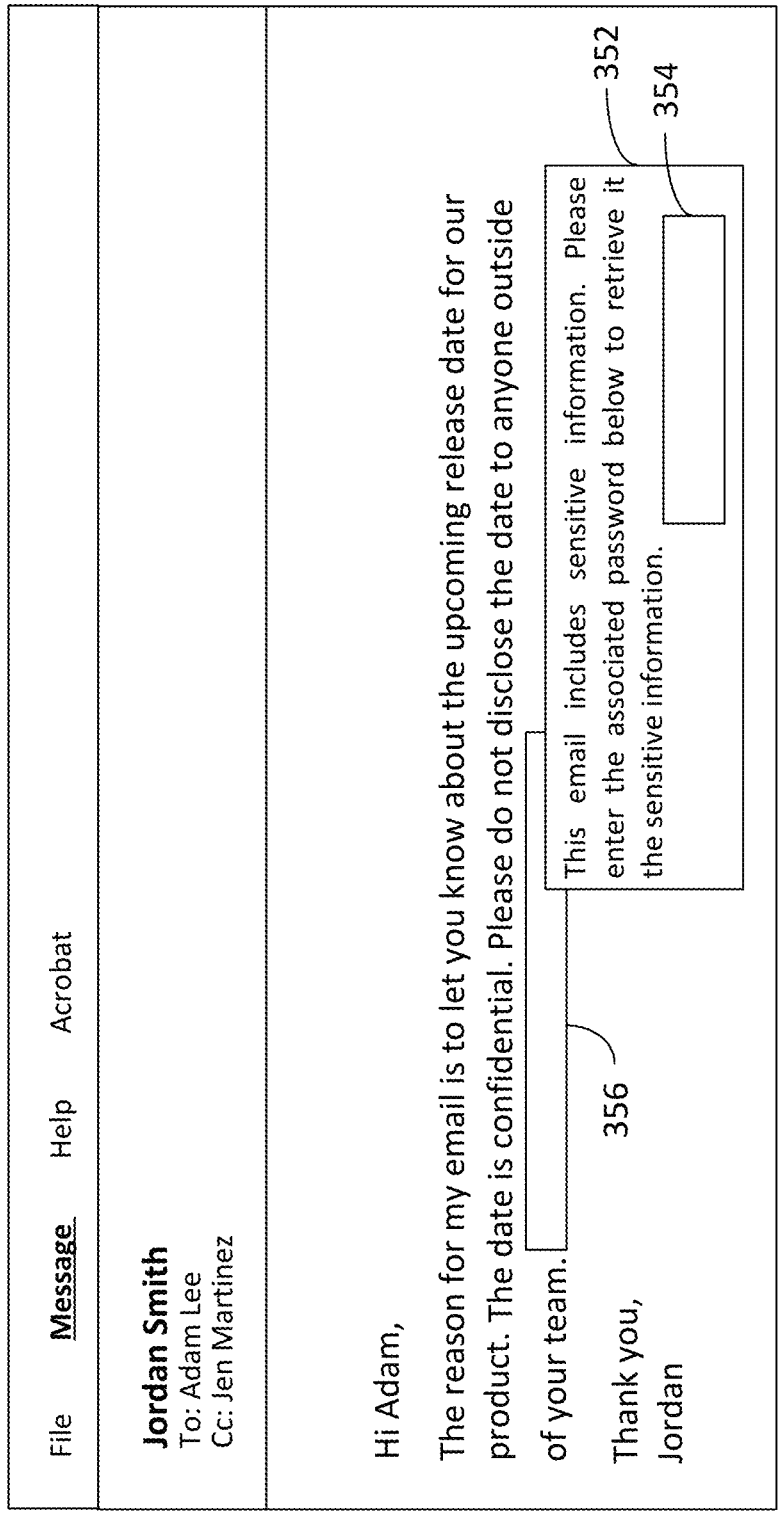

FIGS. 3A-3C depict example UI screens of an application that offers content protection services disclosed herein. The UI screen 300A of FIG. 3A may for example be displayed by a productivity application such as an email application (e.g., Microsoft Outlook®) when a user is drafting an email message. In an example, the UI screen 300A of the application may include a toolbar menu 310 that may display multiple tabs, each of which may provide multiple UI elements for performing various application features. For example, the toolbar menu 310 may provide a menu option 320 for the user to mark portions of the email as sensitive. The UI screen 300A may also include a UI element 330 for sending the message. The UI screen 300A may also include a content pane 340 which may contain the content of the email message 342. The content may be displayed to the user for viewing purposes.

As the user is creating the content of the communication and/or when the user is finished creating the content, the user may use a pointing device such as a mouse to select a portion of the content such as the content portion 344. Once the content portion is selected, the user may utilize a UI element to mark the selected content as being sensitive content. This may be achieved by, for example, utilizing the menu option 320. In other configurations, different mechanisms for marking the content as sensitive may be provided (e.g., displaying a context menu that provides the option for marking the content sensitive). Once the menu option 320 is selected, a pop-up menu may be displayed (not shown) that provides other options with respect to accessibility of the sensitive content. The options may include a custom password for retrieving the content, a time period during which the content is marked sensitive (e.g., for the email message 324, the release date would not be sensitive after the Jun. 15, 2022), a user identification (e.g., email address, Microsoft account username, etc.) of the recipients who are authorized to access the sensitive content, whether a password is required each time the email is opened and the like.

In some implementations, even if the user does not choose to mark the content as sensitive, a recommendation may automatically be generated to suggest marking the content as sensitive. The UI screen 300B of FIG. 3B displays an example of such a recommendation. In some implementations, the recommendation is displayed when the user utilizes the UI element 330 to send a message. In other implementations, the recommendation is displayed when a determination is made that the sensitive content portion is complete or that the communication/document is complete. In another implementation, the recommendation is displayed when the user tries to save the document. This may involve making a determination that content is about to be shared or the document is about to be closed/stored, sending a request to a sensitive content identification model to identify sensitive content, and receiving a recommendation back for display.

Once the recommendation is received, the identified content portion may be visually identified (e.g., by highlighting the portion 344) and the recommendation may be displayed in a UI element such as the UI element 346. The recommendation may include an indication that the content includes sensitive information and provide an option for the user to choose to secure the content. The user may utilize a UI element 348 to mark the identified content as sensitive, upon which the user may be provided with options on the users that are authorized to access the sensitive content and the like. The user may also utilize a UI element 350 to reject the recommendation.

The UI screen 300C of FIG. 3C may be displayed to a recipient of a communication that includes sensitive content. As depicted, the sensitive portion is displayed in a redacted portion 356. Redaction may include completely covering the sensitive portion or otherwise making the sensitive portion unreadable/inaccessible. The UI screen 300C may also display, in a UI element 352, a message to the user that the email contains sensitive information and offer a mechanism for retrieving the information. For example, the UI element 352 may include an input box 354 for entering the password required for accessing the sensitive content. Upon entering the password and confirming that the correct password has been provided, the redacted portion may be displayed in the email.

Figure 4:
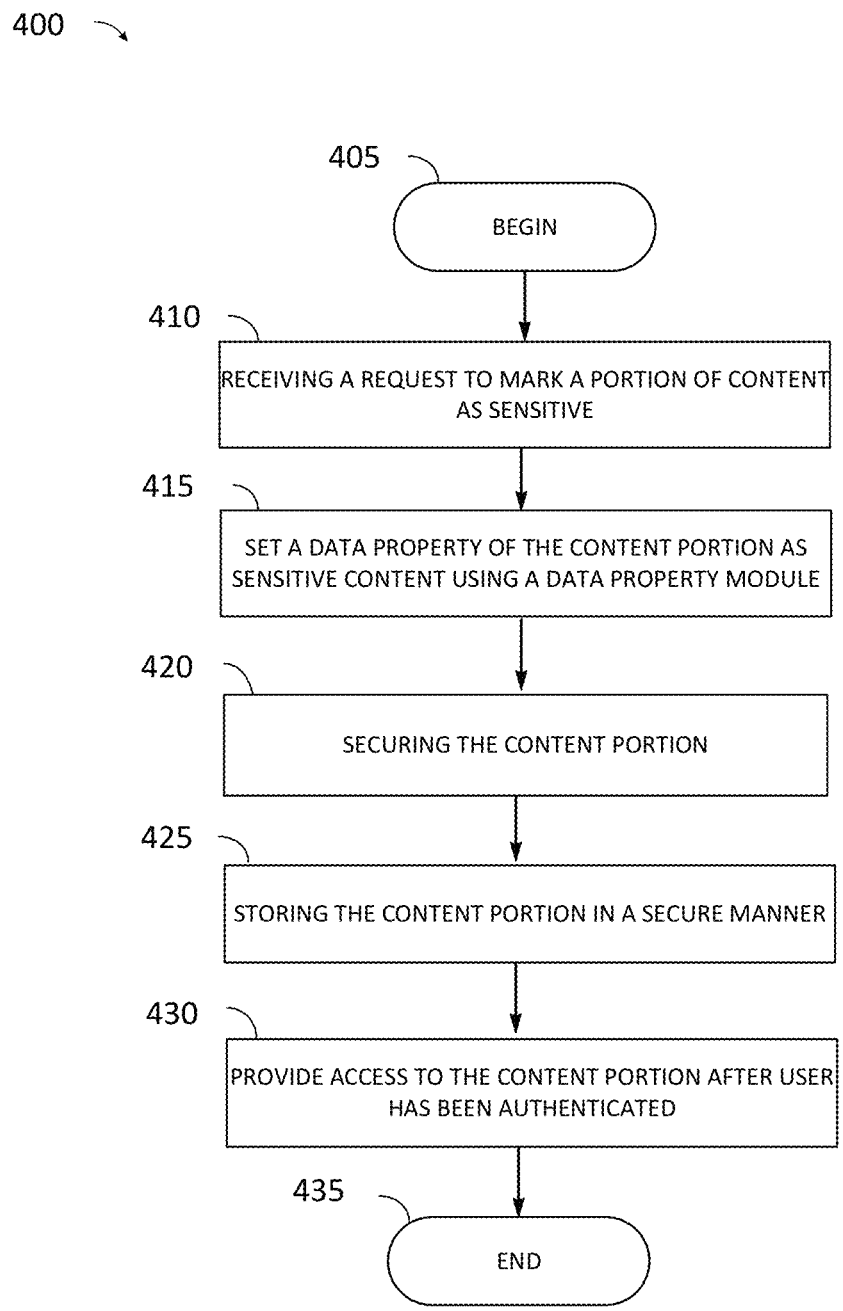
FIG. 4 is a flow diagram depicting an exemplary method for securing a content portion.

FIG. 4 is a flow diagram depicting an exemplary method 400 securing a portion of communication. One or more steps of the method 400 may be performed by a secure content engine such as the secure content engine 136 of FIGS. 1A-1B and/or the secure content management unit 114 of FIGS. 1A-1B. The method 400 may begin, at 405, and proceed to receive request to mark a portion of a communication as sensitive content, at 410. This may occur, for example, when a user utilizes a UI element to indicate that a selected portion of a communication (e.g., an active document) is sensitive information. Sensitive information may be any information that the user considers private, personal, confidential and/or otherwise requiring protection from unauthorized access. The selection may occur in response to an automatically generated recommendation that identifies a portion of content as potentially including sensitive information.

After receiving the request, method 400 may proceed to set a data property associated with the selected portion to sensitive, at 415. This may be achieved by utilizing a data property module. The type of data property and the module used for setting the data property may depend on the type of application used for generating the communication. Once the data property is set, method 400 may proceed to secure the selected portion, at 420. This may be achieved by utilizing a defining unit which may mask the selected portion and initiate security calls for secure handling of the selected portion. Secure handling may involve transmit the selected portion in a secure manner and ensuring that any access to the selected portion requires authentication.

Securing the selected portion may also lead to storing the selected portion in a secure manner, at 425. This may involve storing the selected portion in a specific secured storage location and/or ensuring that the selected portion cannot be accessed without authorization. After the selected portion has been marked as sensitive and/or stored accordingly, the communication may be transmitted to an intended recipient of the communication. Upon receiving the communication, the recipient may be provided access to the unsensitive portion of the communication, while the sensitive portion of the communication is redacted until the user has been authentication. Authentication may involve providing a password and/or other account information associated with access to the selected portion. Once the user is authenticated, access may be provided to the selected portion, at 430, before method 400 ends at 435.

Figure 5:
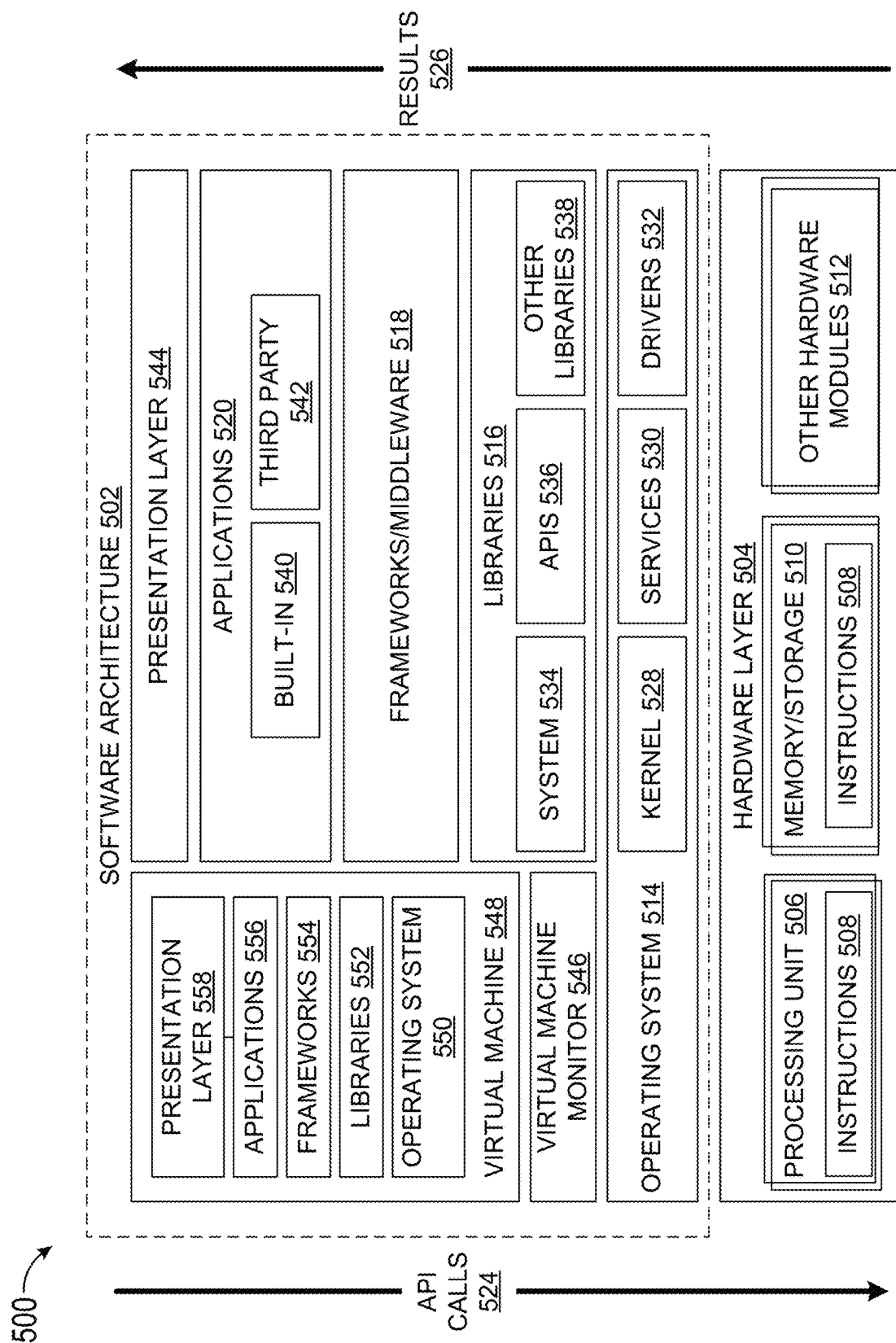
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/ modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
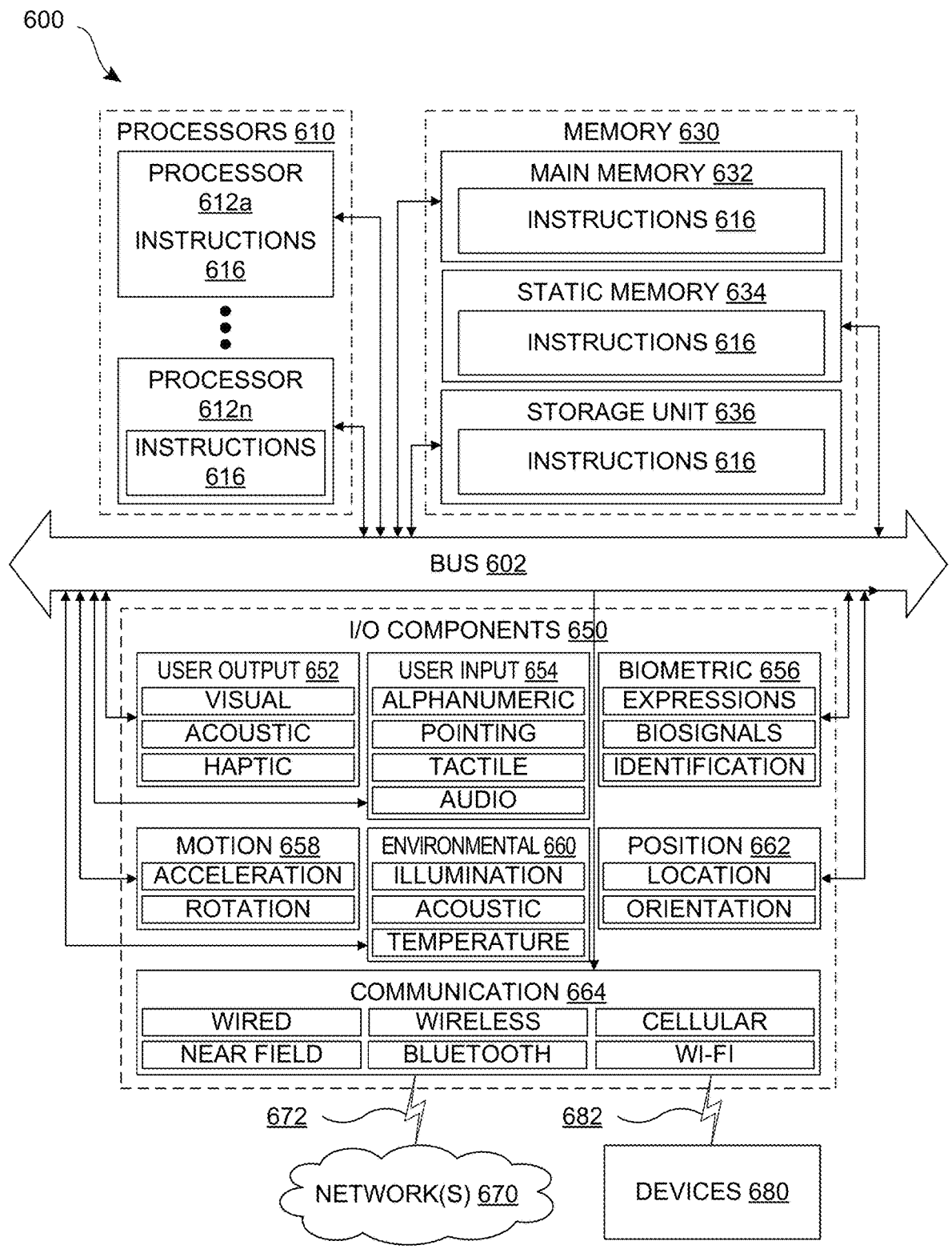
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
 a processor; and
 a memory in communication with the processor, the memory comprising executable instructions that, when executed by the processor, cause the data processing system to perform functions of:
 receiving a request to mark a portion of a communication as sensitive, the communication including an unsensitive portion and the sensitive portion;
 upon receiving the request, setting a data property of the sensitive portion to a sensitive content property;
 securing the sensitive portion by initiating security calls for secure handling of the sensitive portion; and
 transmitting the communication to a recipient,
 wherein upon transmitting the communication:
  access to the unsensitive portion of the communication is provided to the recipient,
  the sensitive portion is redacted until the recipient is authenticated for receiving access to the sensitive portion, and
  upon authenticating the recipient, access to the sensitive portion is provided.

Item 2. The data processing system of item 1, wherein the communication includes at least one of an email message, a text message or an instant message.

Item 3. The data processing system of items 1 or 2, wherein securing the portion includes masking the portion.

Item 4. The data processing system of any preceding item, wherein setting the data property is done via a data property module associated with an application used to create the communication.

Item 5. The data processing system of any preceding item, wherein authentication includes receiving at least one of a password associated with accessing the portion or receiving an account information associated with accessing the portion.

Item 6. The data processing system of item 5, wherein the password is at least one of a custom password which is provided when the portion is marked as sensitive or an authentication password associated with a user account of the recipient.

Item 7. The data processing system of any preceding item, wherein the communication includes at least one of a word document, a video file, an audio file, a note document, a spreadsheet, or a PDF document.

Item 8. The data processing system of any preceding item, wherein initiating the security calls for handling the portion includes informing a security layer that the portion is sensitive.

Item 9. The data processing system of any preceding item, wherein the executable instructions, when executed by the processor, further cause the data processing system to perform functions of:
 automatically identifying the portion as including sensitive information,
 providing a recommendation to a user to secure the portion, and
 responsive to providing the recommendation, receiving the request to mark the portion as sensitive.

Item 10. A method for securing a portion of a communication comprising:
 receiving a request to mark a portion of a communication as sensitive, the communication including an unsensitive portion and the sensitive portion;
 upon receiving the request, setting a data property of the sensitive portion to a sensitive content property;
 securing the sensitive portion by initiating security calls for secure handling of the sensitive portion; and
 transmitting the communication to a recipient,
 wherein upon transmitting the communication:
  access to the unsensitive portion of the communication is provided to the recipient,
  the sensitive portion is redacted until the recipient is authenticated for receiving access to the sensitive portion, and
  upon authenticating the recipient, access to the sensitive portion is provided.

Item 11. The method of item 10, wherein the communication includes at least one of an email message, a text message or an instant message.

Item 12. The method of items 10 or 11, wherein securing the portion includes masking the portion.

Item 13. The method of any of items 10-12, wherein the securing the portion is done by a defining unit.

Item 14. The method of any of items 10-13, wherein authentication includes receiving at least one of a password associated with accessing the portion or receiving an account information associated with accessing the portion.

Item 15. The method of item 14, wherein the password is at least one of a custom password which is provided when the portion is marked as sensitive or an authentication password associated with a user account of the recipient.

Item 16. The method of any of items 10-15, further comprising:
automatically identifying the portion as including sensitive information,
 providing a recommendation to a user to secure the portion, and
 responsive to providing the recommendation, receiving the request to mark the portion as sensitive.

Item 17. The method of item 16, wherein automatically identifying the portion as including sensitive information is done by a trained machine-learning model.

Item 18. A non-transitory computer readable medium on which are stored instructions that, when executed, cause a programmable device to perform functions of:
 receiving a request to mark a portion of a communication as sensitive, the communication including an unsensitive portion and the sensitive portion;
 upon receiving the request, setting a data property of the sensitive portion to a sensitive content property;
 securing the sensitive portion by initiating security calls for secure handling of the sensitive portion; and
 transmitting the communication to a recipient,
 wherein upon transmitting the communication:
  access to the unsensitive portion of the communication is provided to the recipient,
  the sensitive portion is redacted until the recipient is authenticated for receiving access to the sensitive portion, and upon authenticating the recipient, access to the sensitive portion is provided.

Item 19. The non-transitory computer readable medium of item 18, wherein the instructions when executed further cause a programmable device to perform functions of:
automatically identifying the portion as including sensitive information,
providing a recommendation to a user to secure the portion, and
responsive to providing the recommendation, receiving the request to mark the portion as sensitive.

Item 20. The non-transitory computer readable medium of item 19, wherein automatically identifying the portion as including sensitive information is done by a trained machine-learning model.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a request to mark a portion of a communication as sensitive, the communication including an unsensitive portion and the sensitive portion;
upon receiving the request, setting a data property of the sensitive portion to a sensitive content property;
securing the sensitive portion by initiating security calls for secure handling of the sensitive portion; and
transmitting the communication to a recipient,
wherein upon transmitting the communication:
access to the unsensitive portion of the communication is provided to the recipient,
the sensitive portion is redacted until the recipient is authenticated for receiving access to the sensitive portion, and
upon authenticating the recipient, access to the sensitive portion is provided.

2. The data processing system of claim 1, wherein the communication includes at least one of an email message, a text message or an instant message.

3. The data processing system of claim 1, wherein securing the portion includes masking the portion.

4. The data processing system of claim 1, wherein setting the data property is done via a data property module associated with an application used to create the communication.

5. The data processing system of claim 1, wherein authentication includes receiving at least one of a password associated with accessing the portion or receiving an account information associated with accessing the portion.

6. The data processing system of claim 5, wherein the password is at least one of a custom password which is provided when the portion is marked as sensitive or an authentication password associated with a user account of the recipient.

7. The data processing system of claim 1, wherein the communication includes at least one of a word document, a video file, an audio file, a note document, a spreadsheet, or a PDF document.

8. The data processing system of claim 1, wherein initiating the security calls for handling the portion includes informing a security layer that the portion is sensitive.

9. The data processing system of claim 1, wherein the executable instructions, when executed by the processor, further cause the data processing system to perform functions of:

automatically identifying the portion as including sensitive information, providing a recommendation to a user to secure the portion, and responsive to providing the recommendation, receiving the request to mark the portion as sensitive.

10. A method for securing a portion of a communication comprising:

receiving a request to mark a portion of a communication as sensitive, the communication including an unsensitive portion and the sensitive portion;

upon receiving the request, setting a data property of the sensitive portion to a sensitive content property;

securing the sensitive portion by initiating security calls for secure handling of the sensitive portion; and transmitting the communication to a recipient, wherein upon transmitting the communication:

access to the unsensitive portion of the communication is provided to the recipient, the sensitive portion is redacted until the recipient is authenticated for receiving access to the sensitive portion, and upon authenticating the recipient, access to the sensitive portion is provided.

11. The method of claim 10, wherein the communication includes at least one of an email message, a text message or an instant message.

12. The method of claim 10, wherein securing the portion includes masking the portion.

13. The method of claim 10, wherein the securing the portion is done by a defining unit.

14. The method of claim 10, wherein authentication includes receiving at least one of a password associated with accessing the portion or receiving an account information associated with accessing the portion.

15. The method of claim 14, wherein the password is at least one of a custom password which is provided when the portion is marked as sensitive or an authentication password associated with a user account of the recipient.

16. The method of claim 10, further comprising:

automatically identifying the portion as including sensitive information, providing a recommendation to a user to secure the portion, and responsive to providing the recommendation, receiving the request to mark the portion as sensitive.

17. The method of claim 16, wherein automatically identifying the portion as including sensitive information is done by a trained machine-learning model.

18. A non-transitory computer readable medium on which are stored instructions that, when executed, cause a programmable device to perform functions of:

receiving a request to mark a portion of a communication as sensitive, the communication including an unsensitive portion and the sensitive portion;

upon receiving the request, setting a data property of the sensitive portion to a sensitive content property;

securing the sensitive portion by initiating security calls for secure handling of the sensitive portion; and transmitting the communication to a recipient, wherein upon transmitting the communication:

access to the unsensitive portion of the communication is provided to the recipient, the sensitive portion is redacted until the recipient is authenticated for receiving access to the sensitive portion, and upon authenticating the recipient, access to the sensitive portion is provided.

19. The non-transitory computer readable medium of claim 18, wherein the instructions when executed further cause a programmable device to perform functions of:

automatically identifying the portion as including sensitive information, providing a recommendation to a user to secure the portion, and responsive to providing the recommendation, receiving the request to mark the portion as sensitive.

20. The non-transitory computer readable medium of claim 19, wherein automatically identifying the portion as including sensitive information is done by a trained machine-learning model.

* * * * *